United States Patent [19]
Ven et al.

[11] Patent Number: 5,724,814
[45] Date of Patent: Mar. 10, 1998

[54] VAPOR FORCE ENGINE

[76] Inventors: Livien D. Ven, Desguinlei 206, B-2018 Antwerpen, Belgium; Andre R. Vincent, Avenue Du Parc 71, B-4053 Embourg, Belgium

[21] Appl. No.: 851,553

[22] Filed: May 6, 1997

Related U.S. Application Data

[63] Continuation of Ser. No. 277,524, Jul. 19, 1994, abandoned.

[30] Foreign Application Priority Data

Aug. 9, 1993 [BE] Belgium ................. 09300826

[51] Int. Cl.⁶ .................................................. F01K 23/10
[52] U.S. Cl. ......................................... 60/618; 60/671
[58] Field of Search ........................... 60/39.181, 618, 60/651, 671

[56] References Cited

U.S. PATENT DOCUMENTS

| | | |
|---|---|---|
| 3,218,802 | 11/1965 | Sawle . |
| 3,945,210 | 3/1976 | Chapin ............................ 60/618 |
| 4,031,705 | 6/1977 | Berg ............................... 60/618 |
| 4,070,862 | 1/1978 | Doerner et al. . |
| 4,155,865 | 5/1979 | Ostrozynski et al. . |
| 4,224,795 | 9/1980 | Stiel et al. . |
| 4,235,077 | 11/1980 | Bryant ............................ 60/618 |
| 4,347,702 | 9/1982 | Tawse . |
| 4,393,656 | 7/1983 | Anderson et al. ................. 60/618 |
| 4,503,681 | 3/1985 | Willyoung et al. . |
| 4,700,543 | 10/1987 | Krieger et al. . |
| 4,733,537 | 3/1988 | Papastavros . |
| 4,736,045 | 4/1988 | Drakesmith et al. ............... 549/380 |
| 4,896,509 | 1/1990 | Tamura et al. . |
| 4,901,531 | 2/1990 | Kubo et al. ....................... 60/618 |
| 5,182,913 | 2/1993 | Robar et al. . |
| 5,327,987 | 7/1994 | Abelmalek ....................... 60/618 |

FOREIGN PATENT DOCUMENTS

| | | |
|---|---|---|
| 903448 | 1/1945 | France . |
| 2265206 | 10/1975 | France . |
| 2414147 | 10/1975 | Germany ......................... 60/618 |
| 2639187 | 3/1978 | Germany . |
| 3039359 | 5/1982 | Germany . |
| 58-222038 | 12/1983 | Japan . |
| 63-305185 | 12/1988 | Japan . |
| 199568 | 12/1938 | Switzerland . |
| WO93/01397 | 1/1993 | WIPO . |

OTHER PUBLICATIONS

CRC Handbook of Chemistry and Physics, 60th edition, CRC Press, Inc., 1980, p. E-37.

*Primary Examiner*—Michael Koczo
*Attorney, Agent, or Firm*—Jones, Day, Reavis & Pogue

[57] ABSTRACT

A vapor-driven piston-type engine having multiple stages that may be constructed as a single block or unit. Each stage has its own separate vapor power source and the fluids in each stage are different and have different heat/temperature characteristics such that the waste heat from one engine can be used to drive a succeeding engine.

3 Claims, 3 Drawing Sheets

FIG. 8 BOILER
FIG. 9 STAGE I

FIG. 7B

STAGE 3
FIG. 11

STAGE 2
FIG. 10

VAPOR FORCE ENGINE

This application is a continuation of application Ser. No. 08/277,524 filed Jul. 19, 1994, abandoned.

BACKGROUND OF THE INVENTION

1. Field of the Invention

The invention relates in general to a vapor-driven piston-type engine and in particular to a vapor-driven piston-type engine that has a first fluid therein that receives heat from a heat source to vaporize the fluid and drive the piston engine and which includes therein a second closed fluid path in heat exchange relation with the first fluid path to increase the efficiency of the engine. In a still further embodiment, a plurality of the efficient vapor-driven piston-type engines are coupled one to another in different closed circuits whereby the fluid in the first closed circuit in a second or subsequent vapor-driven piston-type engine is heated by the first vapor-driven piston-type engine or by the fluid flowing through it.

2. Description of Related Art

A conventional vapor force piston device contains a vaporizable fluid, an evaporator for vaporizing the fluid, the vapor piston machine and a closed circuit in which the evaporator and the vapor piston machine are interposed for the transport of the fluid. Such a conventional vapor force device of this sort may be a steam power plant which uses water as a fluid. The evaporator is the steam generator and the vapor machine is a steam engine with pistons or a steam turbine driving a current generator.

However, water evaporates at 100° C. under atmospheric pressure. In order to obtain a good efficiency, over-heated or super-heated steam at an even far higher temperature is required. This implies that for the evaporation in the steam generator, high quality and quantities of fuel are required. It further implies that the device cannot work on heat alone at a relatively low temperature even though it may be available in large amounts. Thus the supplied energy is relatively expensive.

In U.S. Pat. No. 3,218,802 and issued in the name of D. R. Sawle, a binary vapor power plant includes a sulfur cycle consisting of a heat source 10 which heats and vaporizes sulfur, a first stage sulfur heat engine 12 which converts the heat in the vapor into kinetic energy, and a heat exchanger 14 that receives the partially cooled sulfur and removes the remainder of the heat. The heat exchanger 14 heats the fluid in conduits 37, 41, and 43 to convey steam to a second stage heat engine 16. Similar systems have been employed at petrochemical plants that use ethylene-oxide reactors. The reactors are cooled by a high temperature, low pressure fluid (diphyl fluid). This fluid is sent to a heat exchanger to produce the super-heated steam. The steam was used in a steam turbine to compress ethylene gas. This system has very difficult problems to overcome since using sulfide, sulfur, phosphorus or even sodium is excluded because steel is hydrogen permeable and hydrogen with the above materials will give severe problems. This is a very high temperature device with saturated sulfur vapor at 682° C. (1260° F.).

In U.S. Pat. No. 4,070,862 issued to Doerner et al., a turbine in power station plants is provided with two different fluids such as water and $H_2$. One of the problems is the leakage from one turbine site to the other. The invention is a choice of two liquids where the second liquid has a lower boiling point than the first liquid and returns the vapor condensate (linkage) to the boiler. The two liquids have low pressures compared to their temperatures at 800° C. with 34 PSIA (234K Pa) and 450° C. at 51 PSIA (352K Pa). Although there are no efficiency figures stated in this patent, the use of such high temperatures and low pressures must have a detrimental influence on the overall efficiency of the turbine.

In U.S. Pat. No. 4,700,543 to Krieger et al., a plurality of independent, closed Rankine cycle power plants, each of which has a vaporizer and is operated by serially applying a medium or low temperature source fluid to the vaporizers of the power plants for producing heat-depleted source fluid. The heat-depleted source fluid is applied to all of the preheaters in parallel. The power plants are shown to be turbines.

Thus, there is a significant need in the art for a vapor-driven piston-type engine that has high efficiency and which operates at relatively low temperatures.

SUMMARY OF THE INVENTION

The present invention aims to remedy these disadvantages and to provide a highly efficient vapor-force piston device whose operation is relatively inexpensive and which, in a particular embodiment, enables practical use to be made of temperature sources at a relatively low temperature, thus enabling the use of inexpensive fuels.

The results are achieved with the present invention because the fluid used in the machine is a fluid with an atmospheric evaporation temperature lower than 50° C. and with such evaporation characteristics that even at a low temperature, high pressure vapor is obtained. Suitable fluids are, in particular, those fluids which are used in cooling installations such as fluorohydrocarbons or an equivalent alternative. A very well-suited fluid, therefore, is 1,1-dichloro 2,2,2-trifluoroethene.

According to a special embodiment of the invention, the evaporator is a heat exchanger having the above-mentioned fluid as a secondary fluid and another liquid as the primary fluid. The heat exchanger may, in a practical sense, form the radiator of an explosion engine, such as an automobile engine, whose coolant forms the primary fluid. Alternatively, the heat exchanger may be a device that exchanges heat between a hot gas and a fluid or may be a boiler that is filled with the primary fluid and that is heated by a heat source. The heat source may be a burner, an electric resistor, solar energy, and the like.

In another embodiment of the invention, the evaporator itself contains the heat source. This heat source may be a burner, a reflective mirror in a solar energy installation or an electric resistor. It may also be an explosion engine, such as an automobile engine, wherein the fluid serves as a coolant for the automobile engine. In case the heat is supplied by such automobile engine, the vapor machine can be connected to the power output shaft of the engine or may be formed in one and the same engine block with the explosion engine and thus both the vapor machine and the explosion engine are coupled to the same power output shaft.

In accordance with another embodiment of the invention, the vapor force device contains more than one vapor machine which are erected one after the other in the form of a cascade. In such case, the plurality of vapor machines may be coupled to each other in closed circuits whereby the fluid in the fluid circuit for the second or subsequent vapor machine is heated by the first or preceding vapor machine and/or by the fluid running through it. Again, in such case, the fluids in the successor circuits may be different, such as each having a different temperature function.

Thus, it is an object of the present invention to provide a vapor force engine that has a primary fluid therein that is heated by the waste heat from an explosion engine such as an automobile engine that has a fluid circulating therethrough to cool the explosion engine.

It is also an object of the present invention to provide an explosion engine and a vapor force engine within a common housing and both having pistons coupled to a common output drive shaft, the explosion engine being cooled by a first fluid that is heated to a first temperature and the vapor force engine being driven by a second fluid having a vaporizing characteristic that is at a lower temperature than the first temperature of the cooling fluid of the explosion engine and that is coupled in heat transfer relationship to the fluid of the explosion engine to be vaporized and drive the vapor engine.

It is still another object of the present invention to provide a vapor engine and an explosion engine mounted in the same housing and wherein the vapor engine has a first fluid therein that cools the explosion engine which vaporizes it to drive the vapor engine.

It is still another object of the present invention to mount a plurality of different vapor machines in the form of a cascade wherein the input fluid to the first vapor machine is of a temperature and character to drive the pistons therein and the waste temperature of the output fluid thereof is such as to heat a second fluid in the second engine to vaporize it and drive the second vapor piston engine, the waste temperature of the fluid output from the second vapor engine being such as to transfer heat to a third fluid in a third vapor piston engine to vaporize the third fluid and drive the third piston engine and then transmit the fluid output of the third engine back to a heater to vaporize the fluid to begin the cycle all over again.

It is also an object of the present invention to cascade a plurality of different vapor machines such that they are mounted in separate closed fluid circuits whereby a different fluid flows in each vapor machine and which receives its input heat from the waste heat of the preceding vapor machine.

It is an important object of the present invention to utilize a vapor-driven piston-type engine that has a first fluid for driving the pistons and a second fluid circulating in a closed loop within the engine in heat transfer relationship with the first fluid to thereby increase the efficiency of the vapor-drive piston-type engine.

Thus, the invention relates to a vapor force engine containing an vaporizable fluid, an evaporator for vaporizing said fluid, a piston engine in a closed fluid circuit in which the fluid is vaporized, is coupled to the piston engine for work, is condensed, and is returned to the evaporator, the improvement comprising a vapor-driven piston-type engine having a vapor input and a fluid output, a heat exchanger having an input and an output coupled to the engine, the heat exchanger receiving a low temperature fluid from the engine fluid output and generating a vaporized fluid for the engine vapor input for driving the piston engine, an explosion engine cooled by a circulating fluid and serving as a source of heat, a radiator on said explosion engine for cooling the circulating fluid and forming the heat exchanger such that the explosion engine circulating fluid is a primary fluid and the low temperature fluid for the vapor force engine is a secondary fluid that flows through the radiator in heat exchange relationship with and is vaporized by the heat of the primary fluid to drive the vapor piston engine, and the low temperature secondary fluid having an atmospheric evaporation temperature less than 240° C. (464° F.) and having evaporation characteristics such that high pressure vapor greater than 10 bar is provided to the vapor input of the vapor driven piston-type engine.

The invention also relates to a low temperature vapor force engine comprising n vapor driven piston-type engines where n≧2, each vapor-driven piston-type engine having a vapor fluid inlet and a fluid outlet, a first heat exchanger coupled to the vapor inlet and the outlet of a first one of the vapor-driven piston-type engines for receiving the fluid from the fluid outlet of the first one of the vapor-driven piston-type engines, a heat source for selectively coupling to the first heat exchanger to vaporize the fluid therein at a temperature less than 180° C. (356° F.) for powering the first one of the vapor-driven piston-type engines, a second heat exchanger for receiving the fluid output from the first vapor-driven piston-type engine at a temperature of less than 120° C. (248° F.), the vapor fluid of the second vapor-driven piston-type engine being coupled to the second heat exchanger for being vaporized at a temperature of less than 120° C. (248° F.) to drive the second vapor-driven piston-type engine, and each succeeding vapor-driven piston-type engine having a heat exchanger between it and the preceding vapor-driven piston-type engine and having a vapor fluid therein that will vaporize and drive the succeeding vapor-driven piston-type engine at a temperature less than the temperature of the output fluid of the preceding vapor-driven piston-type engine.

BRIEF DESCRIPTION OF THE DRAWINGS

These and other objects of the present invention will be more fully understood when taken in conjunction with the following DETAILED DESCRIPTION OF THE DRAWINGS in which:

FIGS. 7A and 7B are block diagram representations using a vapor force piston type engine similar to that in FIG. 5 except illustrating the details of each vapor engine and Baudino motor all coupled to a common shaft; and FIGS. 8, 9, 10 and 11 are each associated with FIG. 7 to explain the pressure and temperature controls thereof.

DETAILED DESCRIPTION OF THE DRAWINGS

Figure 1:
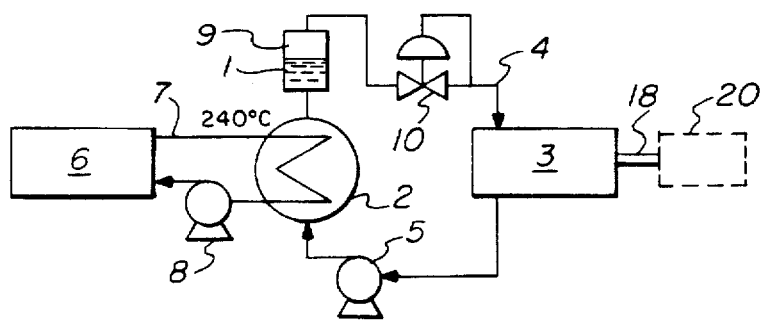
FIG. 1 represents a block diagram of a vapor force device according to the invention.

The novel vapor force device shown in FIG. 1 includes a vaporizable fluid 1, an evaporator 2 for vaporizing the fluid, a vapor driven machine 3 which has pistons driven by the vapor, and a closed fluid path 4 in which the evaporator 2 and the vapor machine 3 are mounted for the transport of the fluid 1. In the closed fluid path 4, upstream of the evaporator 2, is mounted a pump 5. The evaporator 2 may in fact be the radiator of a conventional explosion-type engine 6, such as an automobile engine, in which the fluid, such as water, flows in closed path 7 through the heat exchanger or radiator 2 and is pumped by means of pump 8 back to the explosion engine 6 to continually cool the engine. The heat of the fluid in closed circuit 7 as it exits from the explosion engine 6 to the evaporator 2 may be approximately 240° C. The fluid in the vapor-driven piston-type engine 3 may be of a type that vaporizes below 240° C. such that it will be vaporized by the heat of the liquid in closed path 7 from the explosion engine 6. Thus the invention is characterized in that the fluid 1 is not water, but is a medium which can be easily evaporated and whose atmospheric evaporation temperature or boiling temperature is lower than 240° C. and preferably lower than 30° C. in circumstances as will be seen hereafter and which has evaporation characteristics that, even at a low temperature, will enable high pressure vapor to be obtained. By "low temperature," it should be understood that such low temperatures mean below 240° C., as, for example, 240° C., 180° C., 120° C. or 60°, respectively, and the term "high pressure" means a pressure equal to or greater than 10 bar, for example, higher than 20 bar at 120° C., where 1 bar is equal to 1 atmosphere.

Fluids which meet these conditions and which are thus suited to be used in the device are those fluids which are used in cooling installations such as fluorohydrocarbons. Suited fluids are, for example, fluorohydrocarbons from the series: trichlorofluoromethane, dichlorodifluormethane, chlordifluoromethane, 1,1-dichloro 2,2,2-trifluoroethane, 1,1-dichlor-1-fluorethene, 1-chloro-1,1-difluorethene, 1,1,1, 2-tetrafluorethene and difluoromethane. Further, substitutes such as dichlorotrifluoromethane (for example, KLEA F123 of ICI) and tetrafluoroethene (for example, KLEA 134a of ICI) are interesting. The first mentioned substance has an atmospheric boiling temperature of 27° C. and a critical temperature of 183° C. under a pressure of 36 bar, whereas the last mentioned substance has a boiling temperature under atmospheric pressure of −26° C. but evaporates at 80° C. under 26.3 bar and at 100° C. even under 39.7 bar. The critical temperature of this substance is 101° C. under a pressure of 40.5 bar.

The vapor is supplied in an analogous manner as steam to a vapor machine with pistons driven thereby. In the vapor machine 3, there is a pressure drop. The fluid, under this lower pressure, may have a liquid form and is again pumped to the evaporator 2 by means of the pump 5 as explained earlier. When the temperature in the evaporator 2 is higher than the evaporation temperature under the given pressure for the vapor machine fluid, a super-heated vapor is obtained and preferably slightly super-heated vapor is produced in the evaporator in order to avoid condensation in the vapor machine 3. Such saturated or super-heated vapor is already obtained, thanks to the specially selected fluid, at relatively low temperatures, such that the low-temperature heat sources, which are abundantly available but cannot be easily put to use in an efficient manner, can be used to an advantage. Thus the heat of the explosion engine 6 in FIG. 1 which is otherwise largely lost to the atmosphere can be put to use.

As stated, in the vapor force device represented in FIG. 1, the evaporator 2 is the heat exchanger or radiator of an explosion engine 6 which may be, for example, the radiator of an automobile or other vehicle, which, instead of being cooled with air, is cooled by means of the vapor force engine fluid 1 circulating in the closed path 4. The cooling water which is pumped through the cooling path 7 of the engine 6 by means of the pump 8, and which has a temperature of about 80° C., forms the primary fluid. The fluid which is pumped through the closed path 4 by means of the pump 5 forms the secondary fluid which is heated until it essentially reaches the above-mentioned temperature and thereby evaporates. Downstream of the evaporator 2 is mounted an expansion tank 9 in which the evaporated secondary fluid is collected and non-evaporated fluid is collected. Downstream thereof is mounted a pressure regulating valve 10 in the circuit 4. Saturated or preferably super-heated vapor under high pressure is obtained in the evaporator 2. As indicated above, when tetrafluoroethene is used as the secondary fluid 1 in closed circuit 4, a pressure of 26 bar can be obtained at the outlet of the evaporator 2 at 80° C. The pressure at the inlet of the vapor machine 3 can be set by means of the pressure regulating valve 10, for example, as a function of the pressure in the cylinders of the explosion engine 6. In this way, the explosion engine 6 and the vapor-driven piston-type engine 3 may be united in one and the same engine block and may possibly even have a common shaft 18 that can be coupled with some driven unit 20 as illustrated in phantom lines in FIG. 1.

Figure 2:
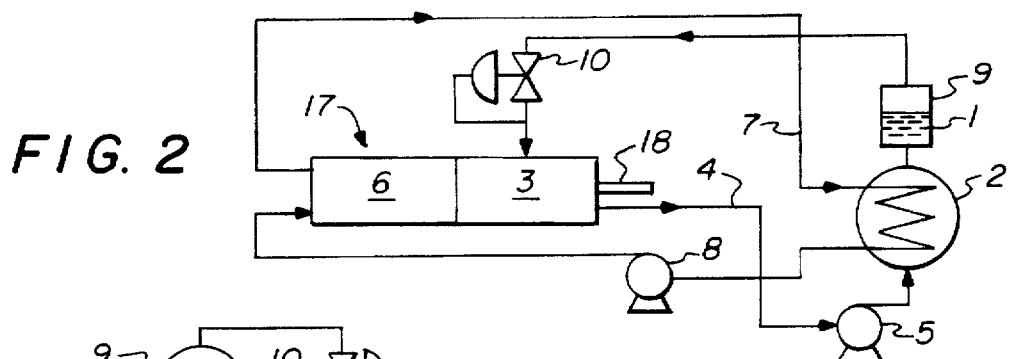
FIG. 2 represents a block diagram analogous to that in FIG. 1 but with reference to another embodiment of the invention where the heat source is an explosion-type engine contained within the same housing as the vapor engine.

As illustrated in FIG. 2, the explosion engine 6 and the vapor-driven piston-type engine 3 may be formed in a common housing 17. The operation of the device is similar to that disclosed in FIG. 1 wherein the cooling water of the explosion engine 6 in closed path 7 passes through evaporator 2, is condensed and is pumped back to the explosion engine 6 by pump 8. The heat given up in the evaporator 2 is applied to the fluid 1 which vaporizes in path 4 and is used to drive the vapor-driven piston-type engine 3. The condensed fluid at the output of the vapor-driven engine 3 is pumped back to the evaporator 2 by the pump 5 where the process is repeated. Again, an expansion tank 9 may be placed in the line.

Figure 3:
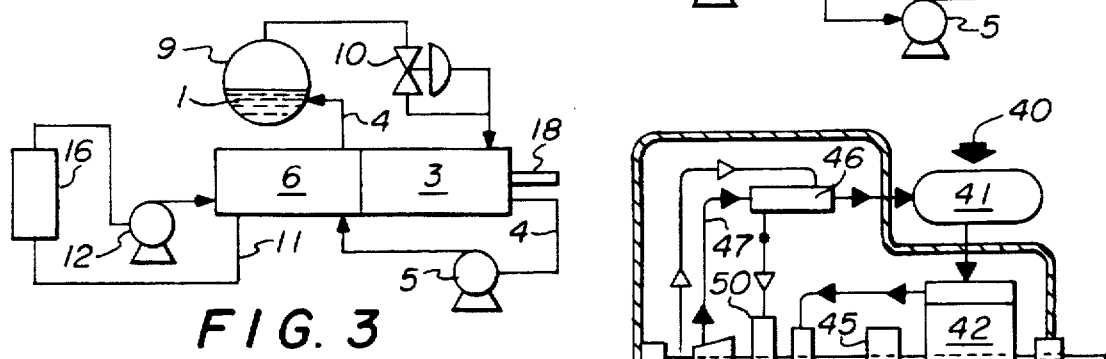
FIG. 3 is a block diagram analogous to that in FIGS. 1 and 2 but with reference to yet another embodiment of the invention wherein the fluid that is vaporized and drives the vapor piston-type engine is the cooling fluid for the explosion-type engine that is housed in a common housing with the vapor-driven piston-type engine.

In the embodiment according to FIG. 3, the evaporator 2 is not the radiator of the explosion engine 6 but is the explosion engine 6 itself which implies that the explosion engine 6 is mounted in the closed fluid path 4 and the fluid 1 forms the coolant of the explosion engine 6. Thus, as the fluid in closed path 4 is pumped by pump 5 through the explosion motor 6, it cools explosion engine 6, is vaporized in the process and is coupled through expansion tank 9 to pressure valve 10, and thence to the vapor-type engine 3 for driving shaft 18. Both the explosion-type motor 6 and the vapor-driven piston-type engine 3 may be coupled to the common shaft 18 to drive the shaft 18. A bypass feeder loop 11 with a pump 12 and a cooler 16 therein is connected to the explosion engine 6 so as to cool off the fluid 1 in closed path 4 in case of a default.

Figure 4:
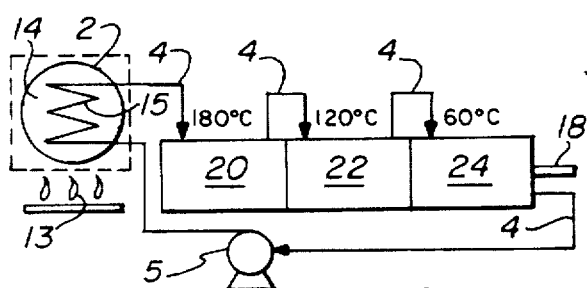
FIG. 4 is a block diagram of another embodiment of the present invention in which the fluid providing the heat sources for a plurality of cascaded vapor-type engines passes through all of the cascaded engines, entering each engine at one temperature sufficient to vaporize a fluid therein, exiting the first engine at a temperature to vaporize the second fluid in the second engine, exiting the second engine at a still lower temperature sufficient to vaporize a third fluid in the third vapor-type engine and coupling the fluid back to the heater for revaporizing the fluid and commencing the cycle over.

FIG. 4 discloses still another embodiment of the novel vapor driven engine in that the heat for the evaporator 2 is not supplied by an explosion engine but by a heat source such as a burner 13 that heats the operating fluid in fluid path 4, by means of a fluid 14 in the evaporator 2 either directly or indirectly, as represented in FIG. 4. In the latter case, the evaporator 2 forms a heat exchanger with a boiler filled with a fluid 14 which forms the primary fluid and a pipe or fluid conduit 15 extending through the boiler and which is part of the fluid path 4 and through which the operating fluid flows as a secondary fluid. In this case, the fluid in closed path 4 enters the first vapor-driven piston-type engine 20 at a temperature, for example, of 180° C. which will drive the piston-type engine 20 and vaporize a first fluid in a first closed system in vapor-driven piston-type engine 20 such as disclosed in relation to FIGS. 1 and 2. The primary fluid in closed fluid path 4 that exits the first vapor-driven piston-type engine 20 is at approximately 120° C. and is coupled to the second vapor-driven piston-type engine 22 in a heat transfer relationship therewith. A second fluid flows in a closed fluid path within the second vapor-driven piston-type engine 22 that vaporizes at a temperature less than 120° C. and thus drives the second vapor piston engine 22. The primary fluid in the closed fluid path 4 exits engine 22 at, for example, approximately 60° C. and is coupled to the third vapor-driven piston-type engine 24 in heat transfer relationship to a third fluid that flows in a closed internal fluid path and which vaporizes at a temperature less than 60° C. to drive the vapor-driven piston-type engine 24. All three engines 20, 22, and 24 are coupled to a common output shaft 18. The fluid in the closed fluid path 4 exits the third vapor-driven piston-type engine 24 as a liquid which is pumped by pump 5 back to the evaporator 2 where it is revaporized and the system repeats itself.

Figure 5:
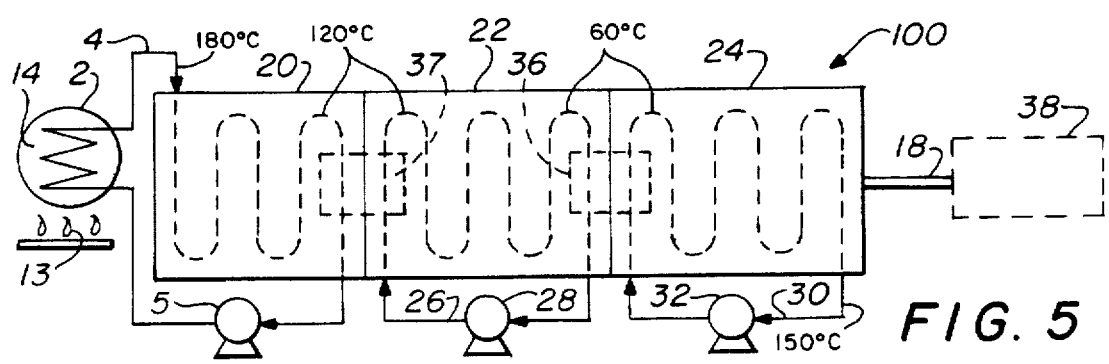
FIG. 5 is a block diagram of still another embodiment of the invention in which each vapor machine has its own closed fluid circuit with the temperature of the output fluid in one engine being sufficient to vaporize a fluid in the succeeding engine and all of which engines are coupled to a common shaft for providing an output.

FIG. 5 is similar to that illustrated in FIG. 4 except the first closed fluid path 4 couples vaporized fluid only to the first vapor-driven piston-type engine 20 and exits the heat exchanger 37, shown in phantom lines, at approximately 120° C. It gives up essentially all of its heat to the second fluid in the second engine 22. Thus, the first fluid then exits heat exchanger 37 as a liquid and is pumped by pump 5 back to the evaporator 2, where the process repeats itself.

The second fluid in second vapor-driven piston-type engine 22 receives essentially most of the 120° C. heat from the first stage which is at a sufficient temperature to vaporize the second fluid and drive the second engine. However, after expending this energy driving the second engine 22, the fluid coupled to the second heat exchanger 36 is at approximately 60°. This heat is transferred to the third fluid in the third vapor-driven piston-type engine 24 where the third fluid is vaporized and drives the third engine 24. The second fluid output from evaporator 36 condenses to a liquid and is pumped by pump 28 through closed fluid path 26 back to evaporator 37 where the process repeats itself. In like manner, the third fluid in the third vapor-driven piston-type engine 24 exits the engine in fluid path 30 at approximately 15° C. as a liquid and is forced by pump 32 back to heat exchanger 36 where the process again repeats itself. The three vapor-driven piston-type engines 20, 22, and 24 are combined in single housing 100 and are all coupled to the same drive shaft 18 for driving some device 38 such as a generator.

It is to be understood, of course, that the heat source 13 in FIGS. 4 and 5 could be solar energy, a hot gas, or any other type of energy desired.

The fluids of the three individual fluid circuits are adapted to the temperatures required. Thus, as a first fluid, the aforesaid fluoro-hydrocarbon F123 can be used and this fluid can be heated to 180° C. in the heat exchanger. In the first vapor engine 20, this fluid cools off to about 120° C. after driving the pistons therein. The second fluid in the second engine 22 is the above-mentioned hydrocarbon F134a which is heated to about 120° C. and thus evaporates and is used to drive the second vapor-driven piston-type engine 22. It cools off to about 60° C. while driving the second vapor-driven piston-type engine 22. This heat can be transferred to the third vapor engine 24 which is supplied to the third fluorohydrocarbon, or working fluid, known as R11. This fluid vaporizes at or below 60° C. temperature and drives the third engine 24 and exits the third engine 24 at approximately 15° C. In FIG. 4, the fluid out of the third engine 24 is transferred back to the evaporator 2 where it is heated again to 180° C. and the cycle is repeated. However, in FIG. 5, each of the separate fluids in the second and third engine 22 and 24 are reheated through the radiators or heat transfer devices 36 and 37.

If the fluid used as the first fluid is one that can be heated to about 240° C. and that cools off to about 180° C. after driving a vapor-driven piston-type engine, such vapor piston engine can be placed between evaporator 2 and the first vapor piston engine 20 shown in FIGS. 4 and 5 and thus a unit is obtained with four temperature levels, which, of course, allows for highly efficient use of the heat. Such embodiments make it possible to increase the output of an explosion engine or other heat source in a simple manner.

Figure 6:
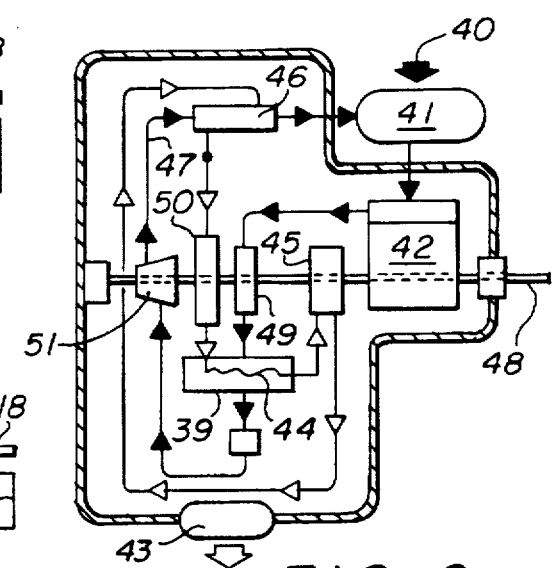
FIG. 6 is a schematic diagram of a Baudino vapor-driven piston-type engine that has two closed fluid circuits and that provides high efficiency.

An efficient engine that can be used as the vapor-driven piston-type engines discussed in relation to FIGS. 1–5 is shown in FIG. 6 in schematic form. It is known as the Baudino motor and is patented in France where it carries publication number FR 2 588 645-A1 and national registration number 85 15545. (This patent was filed in France on Oct. 14, 1985 and was made public on Apr. 17, 1987). The Baudino engine is an anaerobic external combustion engine that uses a combined cycle to co-generate thermal energy (cold, heat) and electrical or mechanical energy that can be used for any purpose by means of rational utilization of any source of heat such as solar energy, coal, gas, and the like which is first converted into thermal drive power, then into productive energy. The engine is quiet and clean and operates, using any fuel, in a closed cycle without valves or an ignition system. It can, therefore, meet the strictest requirements of the new markets requiring the combined use of more than one type of energy such as heat and electricity, and the like by making use of local fuels which existing engines cannot use.

This makes it an attractive alternative for developing countries where it can compete with steam turbines and fuel cells as well as a possible option for many industrialized countries seeking to conquer new markets. The interchangeability of its components make this simple and tough engine a technology that can be adapted to meet requirements as different as decentralized electricity generation, and surface or underwater propulsion.

In this system, the movement of the pistons is not caused in the same way as in conventional engines, as by internal combustion of an air/fuel mixture but by a continuous series of actions performed by two active fluids, a working fluid and a reactivating fluid. These two fluids operate in opposite directions of flow inside an enclosure between two heat sources at different temperatures separated by a two-phase adiabatic heat exchanger. The system receives heat from the outside atmosphere or an external source, generates power that can be used in mechanical, electrical or a thermal form, and discharges the residual heat to its cold source.

The system consists of two separate units, an energy conversion unit to convert the energy used to thermal energy and a fluid tight condensation drive power unit to convert the thermal energy to thermal mechanical or thermal electric energy. The thermal energy conversion chambers adapted to the energy source used such as solar, oils, waste matter, gas, and the like. This energy source can be used continuously since the movement of the pistons is not connected to the injection and the discharge of combustion gases and this considerably reduces the quantity of harmful gases such as nitrogen oxides, carbon monoxide, and the like discharged to the outside atmosphere by conventional engines. The condensation chamber contains the engine block and the driven systems including compressors, pumps, AC generators, fluid tight enclosed fluid/vapor circulation systems and thermal reactivation circuits. The engine block consists of a number of adjacent cylinders such as three, each of which contains a piston to transmit mechanical power to the drive shaft. The compression assembly consists of a number of radially arranged cylinders, three for example, each of which contains a piston that is thermodynamically coordinated with the adiabatic heat exchanger and that is integral with the reactivation thermal coils. This ensures optimal coupling of the engine-compressor assembly and operation at constant torque appropriate to the load. The job of the turbine pump is to ensure constant flow rate circulation and recombination of the working fluid.

Considering now FIG. 6, under the effect of the heat it receives, the working fluid in the high-pressure evaporator 41, evaporates thus increasing its pressure and the vaporized fluid can then be used to drive the engine pistons 42 cyclically in a well-known manner. An external heat source 40 may provide the heat to the working fluid in the container or high-pressure evaporator 41. The evaporated fluid or gas exiting from the pistons 42 is discharged to axial pump 49 and heat exchanger 39 where it transfers a part of its heat in closed circulation to the reactivation fluid in fluid path 44. Heat exchangers 39 and 46 are integrally formed as one unit. Thus, gas exiting piston 42 flows through one part 39 in one direction and through the other part 46 in the other direction. It is then discharged to the cold source 43 where it condenses and then passes through turbine pump 51 to the heat exchanger 46 (in the opposite direction than in heat exchanger 39) and returns to its starting point in the closed container 41 for a new cycle. Thus it should be understood that the heat exchangers 39 and 46 are part of an integral unit through which the gas from the pistons 42 passes in the first direction and then comes back through in the opposite direction as a fluid through the same heat exchange unit. Thus the fluid in the high-pressure tank 41, at equal mass, occupies a greater volume in its vapor phase than in its liquid phase. The difference in volume is converted to power that can be used by the drive shaft 48 and its latent heat is at least partially utilized by the thermal reactivation loop fluid path 44. From the heat exchanger 39, the thermal reactivation fluid is coupled in fluid path 44 to a series of compressors 45 and hence by temperature increases, to the adiabatic heat exchanger 46.

The discharge of the decompressed active fluid from the engine block cylinders 42 (the decompression is not interrupted, but the fluid is decorepressed to equilibrium), and the forced recompression of the fluid in part of the heat exchanger 46, through which the reactivation fluid low pressure circuit 44 passes, is caused by the axial pump 49 which is integral with the turbine 50. The turbine 50, which is mechanically coupled to the drive shaft 48, is partly driven by decompression of the compressed reactivation fluid at 46 and this compensates for a considerable proportion of the power spent on cyclical recombination of the thermal energy. Depending on the type of application, or the type of combustion chamber used to heat the active engine fluid, the thermal reactivation loop is used either to transfer the heat of the working fluid from the inside of the system to the outside or vice versa.

The choice of fluids determine the design technology of the engine and integrate the following parameters: temperature, pressure, heat exchange surface, need for sharp decompression that does not require over-heating at the engine cylinder inputs, and in particular the thermal loops. In theoretical terms, an organic fluid containing fluoro, such as fluorinet FC75 in the thermal drive loop, would combine well with freon R11 in the reactivation loop.

Figure 7A:
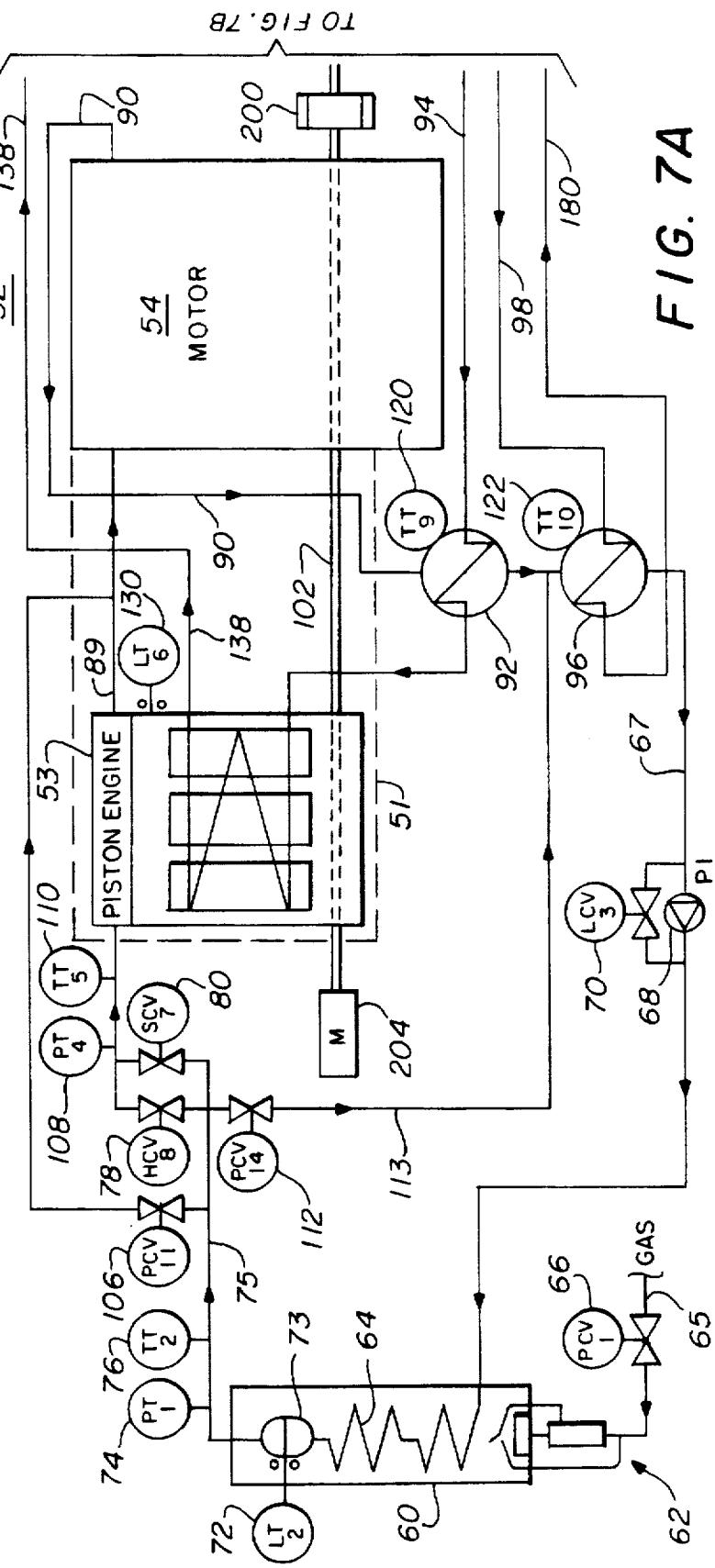
Figures 7B, 10, 11:
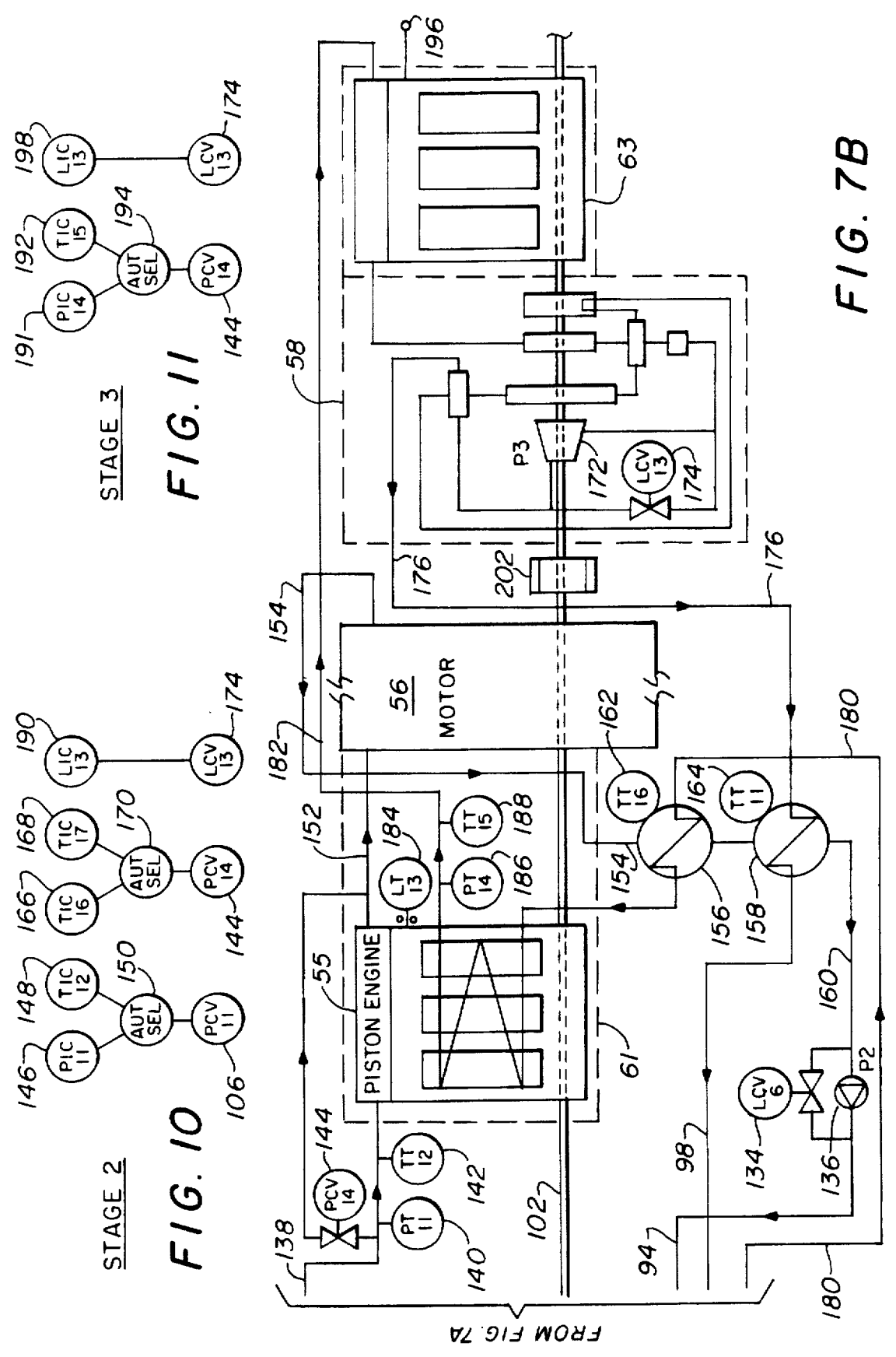

The use of the Baudino motor in a multi-stage vapor-powered engine is illustrated in FIG. 7A and FIG. 7B. The engine 52 comprises three stages 54, 56, and 58, with each stage formed of a Baudino motor. It should be realized that each Baudino motor is represented by that motor disclosed in FIG. 6 and is shown in FIG. 7A and 7B with the engine pistons separated therefrom in order to show the connections between the engine pistons and the remainder of the Baudino motor. Thus in the first stage, the Baudino motor 54 and the engine pistons 53 are within the same housing as represented by the dashed line 51 surrounding the engine pistons 53 and extending from the Baudino motor 54. In like manner, engine pistons 55 are an integral part of the Baudino motor 56 as illustrated by the dashed line 61 surrounding the engine pistons 55. In like manner, the engine pistons 57 in the third stage are formed in the same housing as the Baudino motor 58 as indicated by the dashed line 63 surrounding both of them.

The heat to drive the process of this engine is shown derived from a source such as a boiler 60 with a burner system 62 to provide the heat. A fuel such as gas in line 65 is coupled through a control valve 66 to the burner system 62. The boiler feed liquid in line 64 in boiler 60 is heated by the burner system 62 and vaporized. A pump 68 pumps the liquid fluid into the line 64 into boiler 60. A liquid control valve 70 is in parallel with the pump 68, so that, as will be described later, if the valve 70 is opened, the pump 68 is essentially disabled to stop pumping the fluid as needed.

A liquid level sensor 72 detects the level of the liquid in the expansion tank 73 and the boiler 60. The vaporized liquid is coupled to line 75, where a pressure sensor 74 and a temperature sensor 76 give a constant indication of the pressure and temperature of the vapor in the line 75. Thus, as can be seen in FIG. 8, a computer may be used to control the operation of the various valves and pumps based upon the liquid level, pressure, and temperature indicated by the sensors 72, 74 and 76. Thus, at 82 in FIG. 8, the computer fluid level indicator controller receives the liquid level indication from sensor 72 and sums that signal at 88 with the pressure signal received by the pressure indicator controller 84 that is derived from the pressure sensor 74. The result of the summation at 88 is used to control the level control valve 70 that bypasses the fluid pump 68 as described earlier. Thus, if the level becomes too high and/or the pressure increases beyond preset limits, the liquid control valve 70 is opened the proper amount and controls the amount of fluid that pump 68 can continue to supply to the boiler 60. In like manner, as can be seen at step 86 in FIG. 8, the temperature indicator or controller receives the temperature signal produced by the temperature sensor 76 and is used by the computer through auto selector 85, in conjunction with the pressure indication at step 84 to control the pressure control valve 66 that regulates the amount of gas in line 65 being fed to the burner assembly 62. Thus if the pressure and/or the temperature becomes too high, the amount of gas being fed to the boiler to produce that temperature is decreased by partially closing control valve 66. All of these controls by computer are old and well-known in the art and the operation and control of such valves based upon temperature and pressure signals is not new in and of itself.

The vaporized fluid in line 75 is coupled to a manually adjustable valve 78 which may be similar to a needle valve on a carburetor to allow minimum speed control of the motor. Speed control valve 80 is manually controlled, such as by hand throttle or a foot pedal, but of course, could be controlled by a computer, to provide the amount of vapor necessary to drive engine pistons 53 of the first stage 54 of the Baudino motor. Thus the vapor begins to drive the pistons 53 of the first Baudino motor 54 that begin to rotate shaft 102 which is commonly coupled to all of the stages. The output vapor from pistons 53 on line 89 is used in the Baudino motor 54 as has been explained previously with respect to FIG. 6 and will not be repeated here. The vapor output from the Baudino motor 54 on line 90 is coupled to a preheater 92 which is a heat exchanger that also receives the fluid on line 94 from the second Baudino motor 56 prior to its being coupled to engine pistons 53 as the cooling fluid. In addition, the vapor in line 90 that passes through preheater 92 also passes through a cooler 96 by giving up its remaining heat to the fluid 98 from the third stage Baudino motor 58. Thus, the fluid in line 90 gives up its heat to the fluid in line 98 and is cooled itself to a liquid in line 67 where it is coupled back to pump 68 and the cycle then repeats itself. Thus, as can be seen in FIG. 9, the manual control 104 (or a computer-controlled signal) controls the speed control valve 80 to allow more or less vapor to the piston engine 53 to regulate the engine speed.

The pressure and temperature of the vapor in line 75 entering piston engine 53 is measured by sensors 108 and 110, respectively. Further, a bypass valve 112, when opened, allows the vapor to pass through conduit 113 to the cooler 96 for return to pump 68. Thus, referring to FIG. 9, when the pressure and/or temperature as indicated by sensors 108 and 110 are too high or outside normal limits, the computer, as shown in FIG. 9, through pressure and temperature indicator controllers 114 and 116, uses the sensor signals indicating abnormal pressure and temperature to drive a controller 118 to control the valves 106 and 112. If valve 106 is opened, the vapor can bypass the engine pistons 53 and go directly to the remainder of the Baudino motor 54 at a higher temperature. If the pressure and temperature are such that they must be reduced, then valve 112 is opened to bypass the entire group of Baudino motors and to couple a predetermined portion of the vapor back through cooler 96 where it is condensed to a liquid in line 67 and coupled back to pump 68. Thus, not only the pressure and temperature of the vapor coupled to the Baudino motor piston 53 are controlled but also the pistons 53 can be bypassed entirely or a portion of the vapor can be coupled back to the cooler 96 to preheat the fluid from the second and third stages in conduits 94 and 98.

Further, the temperature at preheater 92 is monitored by sensor 120 while the temperature at cooler (or preheater) 96 is monitored by temperature sensor 122. If the temperature at preheater 92 is below a predetermined temperature as determined by sensor 120, then, referring again to FIG. 9, the computer utilizes that sensor signal through temperature indicator controller 124, and an automatic selector 128 to control PC valve 106 and bypass the engine pistons 53 and couple the vaporized fluid directly to the Baudino motor 54, thus increasing the temperature on the output line 90. In like manner, if the temperature of cooler 96 is below a predetermined level, as determined by sensor 122, then, referring again to FIG. 9, the computer through temperature indicator controller 126 utilizes that information to operate automatic selector 128 and control bypass valve 112 to allow more of the vaporized fluid to be conducted directly to the cooler 96 by bypassing the Baudino motor piston engine 53 entirely and providing more heat to the third stage engine 58 as will be explained hereafter.

In the fluid return line 94 from the second stage Baudino motor 56, there is a pump 136 for pumping the fluid back to the first stage engine pistons 53. The engine pistons 53 serve as the heat source for the fluid for the second stage Baudino motor 56. A fluid level sensor 130 on the piston engine 53 gives an indication if there is a fluid buildup in the piston engine 53. If so, referring again to FIG. 9, the signal generated by the fluid level sensor 130 is used by the computer through level indicator controller 132 to control a valve 134 that bypasses pump 136 to control the amount of fluid being pumped in line 94 back to the heat source or piston engine 53.

Considering the second stage, the fluid pumped by pump 136 (in FIG. 7B) from the second stage Baudino motor 56 passes through the preheater 92 (in FIG. 7A), where, as indicated earlier, it receives heat remaining in the fluid output from the first stage Baudino motor 54 on line 90 and is thus preheated. It is then coupled to the engine piston unit 53 of stage 1 where it serves as the coolant for stage 1 and, in the process, is vaporized and is output from piston engine 53 in conduit 138 to the second stage engine pistons 55 in FIG. 7B. Again, the temperature and pressure of the vapor in conduit 138 is detected by sensors 140 and 142. If either the pressure and/or the temperature exceeds predetermined limits, then referring to FIG. 10, the computer, through pressure and temperature indicator controllers 146 and 148, utilizes the temperature and pressure indications from sensors 140 and 142 to control an automatic selector 150 that controls PC valve 144. PC valve 144 is a pressure control valve that bypasses the engine pistons 55 and couples the fluid directly into the Baudino motor 56 of the second stage. Thus again the pressure and temperature of the fluid that is being supplied to the engine pistons 55 is controlled. Again, the vapor output from piston engine 55 in conduit 152 is coupled to Baudino motor 56 which functions as described previously in reference to FIG. 6. The fluid output of the Baudino motor 56 on line 154 is coupled to a pre-heater 156 and to a cooler (or pre-heater) 158 where the fluid is condensed in conduit 160 and is coupled back to pump 136 for recycling through the second stage as described previously. Again, temperature sensors 162 and 164 are provided for the preheater 156 and the cooler 158, respectively. Should these temperatures be indicated to be improper, the computer, using temperature indicator and controller 166 and 168 in FIG. 10, again using automatic selector 170, controls bypass PC valve 144 to allow the vapor to bypass the engine pistons 55 and be supplied directly to the Baudino motor 56 in the second stage. Thus the output of the second stage Baudino motor 56 on line 154 would then have an increased temperature for supplying to the preheater 156 and the cooler 158.

It will be noted that the third stage of Baudino motor 58 illustrates the details thereof and its connection to the piston engine 63 in the same manner as illustrated in FIG. 6. As indicated earlier, each of the Baudino motors 54 and 56 are likewise constructed. It will be noted that internal pump 172 in Baudino motor 58 in the third stage is driven by the shaft 102. Thus in like manner the pump 68 in the first stage and pump 136 in the second stage may be part of the Baudino motors 54 and 56, respectively, in the same manner as illustrated in Baudino motor 58 in the third stage. However, the pumps 68 and 136 are shown external to Baudino motors 54 and 56 for ease of explanation. Pump 172 pumps the fluid through line 176 out of the Baudino motor 58 to the cooler 158 in the second stage where it picks up some heat and also helps to condense the output vapor from the second stage. It continues to the cooler 96 in the first stage where it does the same thing and picks up additional heat. It then returns in conduit 180 to preheater 156 in the second stage where it picks up more heat from the output vapor of the second stage in conduit 154 and then is fed into the piston engine 55 as the coolant therefor. As it is cooling the pistons 55, it absorbs heat and is vaporized and exits the piston engine 55 in conduit 182 where it returns to the input of the piston engine 63 of Baudino motor 58. There it drives the pistons and then passes through the Baudino motor 58 as explained earlier and repeats the process.

It will be noted in Baudino motor 58 that a level control valve 174 bypasses pump 172. A fluid level sensor indicator 184 is associated with the second stage piston engine 55 thus providing an indication when a predetermined fluid level is reached in piston engine 55. Then, referring to FIG. 10, the signal from fluid level sensor indicator 184 is utilized by the computer and level indication controller 190 to control the fluid level control valve 174 in Baudino motor 58 to open the valve 174 and reduce the amount of fluid being pumped by pump 172. Thus control can be maintained of the fluid level in the piston engine 55 of the second stage.

It will also be noted that at the output of the piston engine 55 of the second stage, that there is a pressure sensor 186 and a temperature sensor 188. Referring now to FIG. 11, a pressure indicator controller 190 is controlled by the computer to operate an auto selector control 194 to control the pressure control valve 144 at the input to the second stage piston engine 55 so as to bypass the engine 55 if necessary and thus increase the temperature of the fluid that is in heat transfer relationship with the fluid from the third stage in the preheater 156 and the cooler 158. Further, fluid level control sensor 196 can be attached to the piston engine 57 of the third stage and referring to FIG. 11, the level indicator controller 198, under control of the computer, may operate the level control valve 174 in the Baudino motor 58 to bypass pump 172 and thus maintain the proper fluid level in the third stage piston engine 63.

It will be noted that gear boxes 200 and 202 interconnect the shaft 102 of the three stages. Thus gear box 200 connects stages one and two with the shaft 102 while gear box 202 couples the second stage to the third stage with the output shaft 102. The gear boxes are well-known and have inner and outer toothed wheels in engagement with each other and a respective shaft portion. This will enable forces on the shaft from the three stages to be balanced even if the speed of the three units is different. When the computer controls the three stages to achieve substantially the same speed, the inner and outer toothed wheels will simply rotate together.

A description of the operation of the multi-stage vapor-powered engine 52 shown in FIG. 7A and FIG. 7B is now discussed. During start-up, the boiler 60 and burner 62 are started with a signal that initiates the following sequence: first, the liquid supply pump 68 is activated and the level of the liquid in the boiler 60 is controlled based on the output signal from level sensor 72 as indicated previously. At the same time, the pilot light of the burner system 62 opens a safety valve in a well-known manner and allows fuel in line 65 to flow through pressure control valve 66 and is ignited by burner 62. The burner 62 is open to a maximum flow rate which heats up the system and brings it to the required pressure. To commence operation, a starter motor 204 may be connected to and rotate shaft 102 to begin circulating the fluid to the various stages by the pumps 68 in the first stage, 136 in the second stage, and 172 in the third stage. It will be recalled, as stated earlier, that pumps 68 and 136 in the first and second stages, respectively, can be a part of the Baudino motor as illustrated by pump 172 in the third stage Baudino motor 58. When pressure indicator 74 and temperature indicator 76 in conduit 75 to the first stage piston engine 53 indicate that the input to the system is brought to the required pressure and temperature, the computer controls the gas valve 66 as explained earlier to maintain the required pressure. Because of the extremely small volume of the liquid in the boiler, this operation takes only a few seconds.

The motor 52 is operated at a minimum speed by the adjusted needle control valve 78 as explained earlier and the desired speed is controlled by operation of the manual control valve 80 to drive stage one. To have a fast balanced system, stages two and three can be activated quickly by controlling bypass valves 106 in the first stage and 144 in the second stage to cause a predetermined amount of the vaporized fluid to be transferred immediately to the second and third stages. These bypass valves 106 and 144 are controlled by the computer through the pressure controllers 106 in FIG. 9 and 144 in FIG. 10. They are also controlled by temperature controllers 166 in FIG. 10 and 192 in FIG. 11 based on the temperature sensors 122 in the first stage and 158 in the second stage at the outlet of coolers 96 and 158, respectively, from stages one and two.

Thus the three pressures applied to stages one, two and three as indicated by associated pressure sensors are based on the pressures and temperatures of the inputs and outputs of each stage. The pressure control valves 106, 112 and 144 are controlled by the computer to bring the system quickly into balance. Once the stages are in balance, then these valves will be either closed or operated at reduced positions based on the computer control.

The three stages are individually powered units and the forces applied to the shaft are required to be balanced. Therefore the speed of the three units may be different and yet mechanically changed by the inner and outer toothed wheels illustrated by gear boxes 200 and 202 in FIG. 7A and FIG. 7B. By mechanically allowing the toothed wheels to rotate with respect to each other in a well-known manner, the forces applied to shaft 102 are balanced. The pressures on the pistons and in the lines as determined by pressure sensors as indicated, indicate the measurements of the power on each shaft from each stage. A computer compares these power measurements in a well-known manner and the heat flux from one stage to another is varied by the computer as indicated to regulate the speed of shaft rotation of the three stages.

Because, as indicated earlier, each of the Baudino motors 54, 56, and 58 utilize a different fluid that boils at a temperature less than the output temperature of the preceding stage, stage 2 is receiving waste energy from stage 1 and stage 3 is receiving waste energy from stage 2. In the case of needed energy in either stage 2 or stage 3 to balance the power, stages 2 and 3 are able to receive additional energy through the bypass valves 106 and 144 from stage 1 or stage 2 thus controlling the transfer temperature in the preheaters 92 and 156 and coolers 96 and 158. The computer controls the overall heat balance to obtain the optimum working conditions and the cooling temperatures in coolers 96 and 158. The coolers of stage 1 and stage 2, 96 and 158 respectively, are designed such that the maximum heat flux during heat transfer periods is taken into consideration. Of course the coolers may be oversized to avoid cavitation in the pumps and to safely cool the liquid.

All of the controllers in the systems shown in FIGS. 8, 9, 10 and 11 by the numerals 82, 84, 86, 104, 114, 116, 124, 126, 132, 146, 148, 166, 168, 190, 191, 192 and 198 are all proportional-integral controllers that are well-known in the art and are such that when the engine functions are noted to have a certain deviation from a set point as indicated by measurement signals, the integral function is eliminated. The integral function comes back into service whenever it is necessary to avoid overshooting in control as is well-known in the prior art.

To increase or decrease the power or speed of the motor, the main supply valve 66 for the fuel is open to stage 1 and boiler 60. Because temperature and pressure are always kept constant at the output of the boiler 60, quick acceleration or heavy tracking at low speed is possible without perturbation of the combustion. Thus the pressure and temperature of the fluid from the boiler 60 are controlled separately from the pressure and temperature that are generated by each of the piston engines 53 and 55 for the three stage motors. The temperature controllers are in auto select operation to limit the temperature of the vapors in the coolers and/or preheaters.

Thus the present invention relates to a vapor engine that has multiple stages but may be formed in a single block. Each stage has it own separate vapor power source and the fluids in each stage are different and have different heat/ temperature characteristics. In operation, a first fluid passing through the first stage itself is heated by a boiler to a first temperature and passes through the first engine stage. The first fluid is pumped back to the boiler by a pump. Stage 1 drives an engine shaft. Excess temperature of the first stage is passed to a cooling fluid from the second stage. The cooling fluid of the second stage is a second different fluid which, at a second lower temperature, uses the waste heat of the first stage to drive pistons which are also coupled to the same shaft as the first stage. The second fluid of the second stage passes through an internal heat exchanger and is pumped back to the first stage for recirculation. A third engine stage has a third different fluid which passes through the heat exchangers of both the first and second stages where it is heated to a third lower temperature than the second stage waste heat and then drives the common shaft after which the third fluid is pumped back to the second stage to be recirculated. The three stages may be mounted one after another in a cascade form and be constructed in one unitary engine block. The fluids in the three circuits are all different and are adapted to vaporize at the temperature required by those particular engine stages. Fluorohydrocarbons may be employed as the fluids.

While the invention has been described in connection with a preferred embodiment, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. An improved low temperature engine including a vaporizable fluid, an evaporator for vaporizing said fluid, a vapor-driven piston-type engine, and a closed fluid circuit in which the fluid is vaporized, coupled to the vapor-driven piston-type engine for work, condensed, and returned to the evaporator, the improvement comprising:

a vapor input and a fluid output coupled to said vapor-driven piston-type engine;

a heat exchanger having an input and an output coupled to said vapor-driven piston-type engine, said heat exchanger receiving a low temperature fluid from said engine fluid output and generating a vaporized fluid for said engine vapor input for driving said piston engine;

an explosion engine cooled by a circulating fluid and serving as an external source of heat;

a common drive shaft coupled to both the piston-type engine and the explosion engine;

a radiator on said explosion engine for cooling said circulating fluid and forming said heat exchanger such that the explosion engine circulating fluid is a primary fluid and said low temperature fluid is a secondary fluid that flows through said radiator in heat exchange relationship with and is vaporized by the heat of said primary fluid to drive said vapor piston engine; and said low-temperature secondary fluid is 1,1-dichloro 2,2, 2-trifluoroethene having an atmospheric evaporation temperature less than 30° C. (86° F.) and having evaporation characteristics such that high-pressure vapor greater than 10 bar is provided to said piston-type engine as said vapor input.

2. An improved low temperature engine including a vaporizable fluid, an evaporator for vaporizing said fluid, a vapor-driven piston-type engine, and a closed fluid circuit in which the fluid is vaporized, coupled to the vapor-driven piston-type engine for work, condensed, and returned to the evaporator, the improvement comprising:

a vapor input and a fluid output coupled to said vapor-driven piston-type engine;

a heat exchanger having an input and an output coupled to said vapor-driven piston-type engine, said heat exchanger receiving a low temperature fluid from said engine fluid output and generating a vaporized fluid for said engine vapor input for driving said piston engine;

an explosion engine cooled by a circulating fluid and serving as an external source of heat;

a common drive shaft coupled to both the piston-type engine and the explosion engine;

a radiator on said explosion engine for cooling said circulating fluid and forming said heat exchanger such that the explosion engine circulating fluid is a primary fluid and said low temperature fluid is a secondary fluid that flows through said radiator in heat exchange relationship with and is vaporized by the heat of said primary fluid to drive said vapor piston engine; and said low-temperature secondary fluid is tetrafluoroethene having an atmospheric evaporation temperature less than 30° C. (86° F.) and having evaporation characteristics such that high-pressure vapor greater than 10 bar is provided to said piston-type engine as said vapor input.

3. A low-temperature vapor force engine including:

a unitary housing block;

a vapor driven reciprocating piston-type engine and housing block and having a vapor input and a low temperature output fluid formed of 1,1,-dichloro 2,2,2-trifluoroethene and having an atmospheric evaporation temperature less than 30° C. (86° F.);

an explosion engine in the housing block and being cooled by a circulating fluid;

a radiator external of the unitary housing block and coupled to the explosion engine for cooling the circulating fluid;

the explosion engine circulating fluid being a primary fluid and the low-temperature fluid being a secondary fluid that flows through the radiator in heat exchange relationship with and is vaporized by the heat of the primary fluid to drive the vapor piston engine; and a common drive shaft coupling both the piston-type engine and the explosion engine.

* * * * *